(12) United States Patent
Wang

(10) Patent No.: US 12,143,642 B2
(45) Date of Patent: Nov. 12, 2024

(54) END OF SEQUENCE INDICATION IN CODED VIDEO

(71) Applicant: Bytedance Inc., Los Angeles, CA (US)

(72) Inventor: Ye-Kui Wang, San Diego, CA (US)

(73) Assignee: Bytedance Inc., Los Angeles, CA (US)

( * ) Notice: Subject to any disclaimer, the term of this patent is extended or adjusted under 35 U.S.C. 154(b) by 0 days.

(21) Appl. No.: 18/079,303

(22) Filed: Dec. 12, 2022

(65) Prior Publication Data

US 2023/0113199 A1 Apr. 13, 2023

Related U.S. Application Data

(63) Continuation of application No. PCT/US2021/037121, filed on Jun. 11, 2021.

(Continued)

(51) Int. Cl.
*H04N 19/70* (2014.01)
*H04N 19/105* (2014.01)
(Continued)

(52) U.S. Cl.
CPC .......... *H04N 19/70* (2014.11); *H04N 19/105* (2014.11); *H04N 19/109* (2014.11); *H04N 19/136* (2014.11); *H04N 19/172* (2014.11); *H04N 19/174* (2014.11); *H04N 19/184* (2014.11); *H04N 19/188* (2014.11); *H04N 19/30* (2014.11); *H04N 19/31* (2014.11); *H04N 19/42* (2014.11); *H04N 19/503* (2014.11)

(58) Field of Classification Search
CPC ...................................................... H04N 19/70
See application file for complete search history.

(56) References Cited

U.S. PATENT DOCUMENTS

| 2005/0175098 A1* | 8/2005 | Narasimhan ....... H04N 21/2368 375/240.26 |
| 2012/0243612 A1 | 9/2012 | Wiegand |

(Continued)

FOREIGN PATENT DOCUMENTS

| WO | 2021241963 A1 | 12/2021 |
| WO | 2021257529 A1 | 12/2021 |

OTHER PUBLICATIONS

"Series H: Audiovisual and Multimedia Systems Infrastructure of audiovisual services—Coding of moving video High efficiency video coding," Rec. ITU-T H.265 | ISO/IEC 23008-2 (in force edition), Nov. 2019, 712 pages.

(Continued)

*Primary Examiner* — Kyle M Lotfi
(74) *Attorney, Agent, or Firm* — Conley Rose, P.C.

(57) ABSTRACT

Methods, systems and devices for using end of sequence indications are described. An example method of video processing includes performing a conversion between a video and a bitstream of the video, wherein the bitstream includes multiple layers in multiple access units, AUs, including one or more pictures according to a format rule, wherein the format rule specifies that, responsive to an end of sequence (EOS) network abstraction layer (NAL) unit for a first layer being present in a first access unit (AU) in the bitstream, a subsequent picture of each of one or more higher layers of the first layer in an AU following the first AU in the bitstream is a coded layer video sequence start (CLVSS) picture.

20 Claims, 11 Drawing Sheets

600

Performing a conversion between a video comprising one or more pictures and a bitstream of the video, the bitstream conforming to a format rule that specifies a constraint on a value of a first syntax element that specifies whether a second syntax element is present in a picture header syntax structure of a current picture, and the second syntax element specifying a value of a picture order count (POC) most significant bit (MSB) cycle of the current picture — 610

Related U.S. Application Data

(60) Provisional application No. 63/038,601, filed on Jun. 12, 2020.

(51) Int. Cl.
  *H04N 19/109*  (2014.01)
  *H04N 19/136*  (2014.01)
  *H04N 19/169*  (2014.01)
  *H04N 19/172*  (2014.01)
  *H04N 19/174*  (2014.01)
  *H04N 19/184*  (2014.01)
  *H04N 19/30*   (2014.01)
  *H04N 19/31*   (2014.01)
  *H04N 19/42*   (2014.01)
  *H04N 19/503*  (2014.01)

(56) References Cited

U.S. PATENT DOCUMENTS

| | | |
|---|---|---|
| 2014/0086336 A1 | 3/2014 | Wang |
| 2014/0119436 A1 | 5/2014 | Mathew et al. |
| 2014/0334557 A1 | 11/2014 | Schierl et al. |
| 2015/0110473 A1 | 4/2015 | Wang et al. |
| 2015/0264404 A1 | 9/2015 | Hannuksela |
| 2015/0271525 A1 | 9/2015 | Hendry |
| 2015/0271526 A1 | 9/2015 | Hendry et al. |
| 2015/0373333 A1 | 12/2015 | Wang et al. |
| 2016/0295211 A1 | 10/2016 | Sato |
| 2017/0105004 A1 | 4/2017 | Chen et al. |
| 2019/0058895 A1 | 2/2019 | Deshpande |
| 2019/0261011 A1 | 8/2019 | Hannuksela |
| 2020/0154116 A1* | 5/2020 | Wang ............ H04N 19/105 |
| 2021/0289219 A1* | 9/2021 | Seregin ........... H04N 19/30 |
| 2021/0368207 A1 | 11/2021 | Li |
| 2021/0368208 A1 | 11/2021 | Samuelsson |
| 2021/0392378 A1 | 12/2021 | Deshpande |
| 2022/0217416 A1 | 7/2022 | Hendry |
| 2022/0368930 A1 | 11/2022 | Filippov |
| 2023/0087640 A1 | 3/2023 | Filippov |
| 2023/0224479 A1* | 7/2023 | Sánchez De La Fuente ............ H04N 19/184 375/240.02 |

OTHER PUBLICATIONS

Document: JVET-G1001-v1, Chen, J., et al., "Algorithm description of Joint Exploration Test Model 7 (JEM7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.

Document: JVET-R2001-vA, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 524 pages.

Document: JVET-S0152-v5, Wang, Y., "AHG2: Editorial input of a text integration for the May 2020 HLS AHG meeting outcome," Joint Video Experts Team (JVET) of ITU-T SG 16 WP 3 and ISO/IEC JTC 1/SC 29/WG 11 19th Meeting: by teleconference, Jun. 22,-Jul. 1, 2020, 5 pages.

Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.

Li, X., VTM software, Retrieved from the internet: https://vcgit.hhi.fraunhofer.de/jvet/VVCSoftware_VTM.git, Mar. 8, 2023, 3 pages.

Foreign Communication From a Related Counterpart Application, PCT Application No. PCT/US2021/037118, International Search Report dated Sep. 23, 2021, 19 pages.

Foreign Communication From a Related Counterpart Application, PCT Application No. PCT/US2021/037121, International Search Report dated Nov. 15, 2021, 11 pages.

Foreign Communication From a Related Counterpart Application, PCT Application No. PCT/US2021/037123, International Search Report dated Sep. 16, 2021, 16 pages.

Non-Final Office Action dated Apr. 7, 2023, 15 pages, U.S. Appl. No. 18/079,219, filed Dec. 12, 2022.

Non-Final Office Action dated Apr. 7, 2023, 16 pages, U.S. Appl. No. 18/079,154, filed Dec. 12, 2022.

Document JVET-S0160-v3, Wang, Y.K., et al., "AHG9/AHG12/AHG8: Miscellaneous HLS cleanups," Joint Video Experts Team (JVET) of ITU-T SG 16 WP 3 and ISO/ IEC JTC 1/SC 29/SWG 11 19th Meeting: by teleconference, Jun. 22,-Jul. 1, 2020, 3 pages.

Extended European Search Report from European Application No. 21822889.8 dated Sep. 18, 2023, 10 pages.

Document: Document: JVET-S0160-v4, Wang, Y.K., et al., "AHG9/AHG12/AHG8: Miscellaneous HLS cleanups," Joint Video Experts Team (JVET) of ITU-T SG 16 WP 3 and ISO/IEC JTC 1/SC 29/WG 11, 19th Meeting: by teleconference, Jun. 22,-Jul. 1, 2020, 7 pages.

* cited by examiner

END OF SEQUENCE INDICATION IN CODED VIDEO

CROSS-REFERENCE TO RELATED APPLICATION

This application is a continuation of International Application No. PCT/US2021/037121 filed on Jun. 11, 2021, which claims the priority to and benefits of U.S. Provisional Patent Application No. U.S. 63/038,601 filed on Jun. 12, 2020. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques for end of sequence indications that can be used by video encoders and decoders to perform video encoding, decoding, or processing.

In one example aspect, a video processing method is disclosed. The method includes performing a conversion between a video comprising one or more pictures and a bitstream of the video, wherein the bitstream conforms to a format rule, wherein the format rule specifies a constraint on a value of a first syntax element that specifies whether a second syntax element is present in a picture header syntax structure of a current picture, and wherein the second syntax element specifies a value of a picture order count (POC) most significant bit (MSB) cycle of the current picture.

In another example aspect, a video processing method is disclosed. The method includes performing a conversion between a video comprising one or more pictures and a bitstream of the video, wherein the bitstream conforms to a format rule, wherein the format rule specifies a derivation of a picture order count (POC) in an absence of a syntax element, and wherein the syntax element specifies a value of the POC most significant bit (MSB) cycle of a current picture.

In yet another example aspect, a video processing method is disclosed. The method includes performing a conversion between a video and a bitstream of the video, wherein the bitstream comprises access units (AUs) comprising pictures according to a rule, wherein the rule specifies that gradual decode refresh (GDR) pictures are disallowed in the bitstream in response to an output order of the AUs being different from a decoding order of the AUs.

In yet another example aspect, a video processing method is disclosed. The method includes performing a conversion between a video and a bitstream of the video, wherein the bitstream comprises multiple layers in multiple access units, AUs, comprising one or more pictures according to a format rule, wherein the format rule specifies that, responsive to an end of sequence (EOS) network abstraction layer (NAL) unit for a first layer being present in a first access unit (AU) in the bitstream, a subsequent picture of each of one or more higher layers of the first layer in an AU following the first AU in the bitstream is a coded layer video sequence (CLVS) start (CLVSS) picture.

In yet another example aspect, a video processing method is disclosed. The method includes performing a conversion between a video and a bitstream of the video, wherein the bitstream comprises multiple layers in multiple access units, AUs, comprising one or more pictures according to a format rule, wherein the format rule specifies that, responsive to a first picture in a first access unit being a coded layer video sequence start (CLVSS) picture that is a clean random access (CRA) picture or a gradual decoding refresh (GDR) picture, a second picture is a CLVSS picture.

In yet another example aspect, a video processing method is disclosed. The method includes performing a conversion between a video comprising one or more pictures and a bitstream of the video according to a rule, wherein the rule specifies that the bitstream comprises at least a first picture that is output, wherein the first picture is in an output layer, wherein the first picture comprises a syntax element equaling one, and wherein the syntax element affects a decoded picture output and a removal process associated with a hypothetical reference decoder (HRD).

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclosed. The code embodies one of the methods described herein in the form of processor-executable code.

These, and other, features are described throughout the present document.

DETAILED DESCRIPTION

Figure 1:
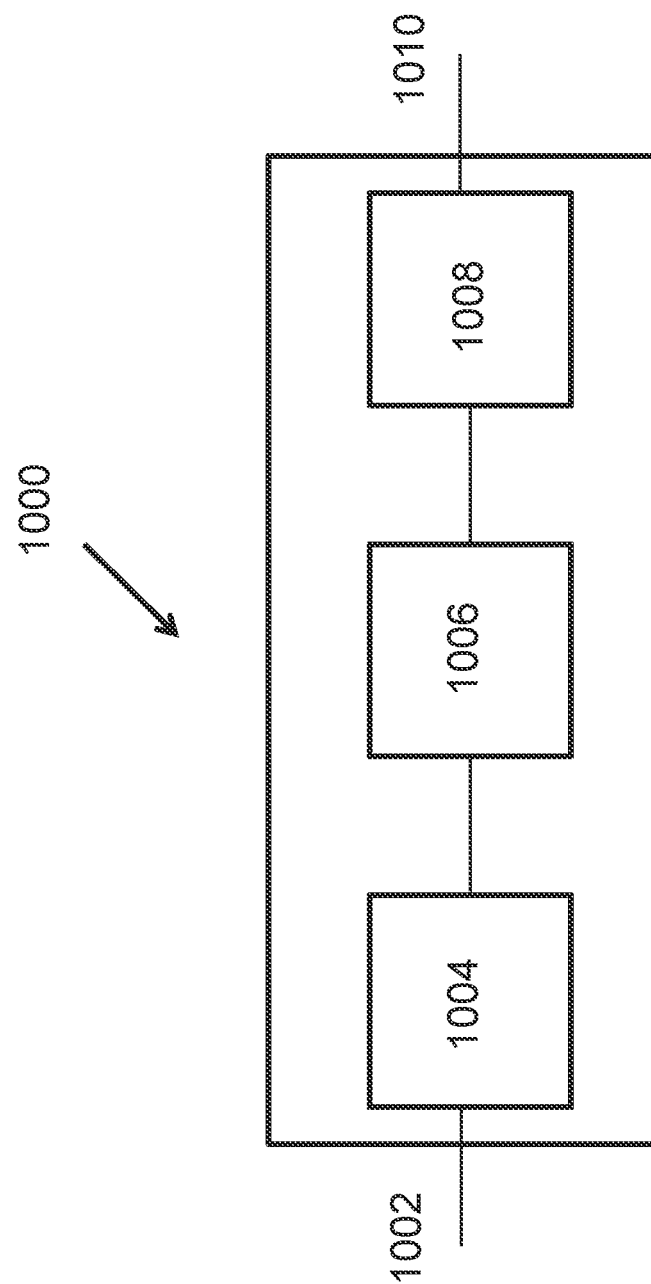
FIG. 1 is a block diagram showing an example video processing system in which various techniques disclosed herein may be implemented.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. Introduction

This document is related to video coding technologies. Specifically, it is about defining levels and bitstream conformance for a video codec that supports both single-layer video coding and multi-layer video coding. It may be applied to any video coding standard or non-standard video codec that supports single-layer video coding and multi-layer video coding, e.g., Versatile Video Coding (VVC) that is being developed.

2. Abbreviations

APS Adaptation Parameter Set
AU Access Unit
AUD Access Unit Delimiter
AVC Advanced Video Coding
CLVS Coded Layer Video Sequence
CLVSS Coded Layer Video Sequence Start
CPB Coded Picture Buffer
CRA Clean Random Access
CTU Coding Tree Unit
CVS Coded Video Sequence
DCI Decoding Capability Information
DPB Decoded Picture Buffer
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
ILP Inter-Layer Prediction
ILRP Inter-Layer Reference Picture
JEM Joint Exploration Model
LTRP Long-Term Reference Picture
MCTS Motion-Constrained Tile Sets
NAL Network Abstraction Layer
OLS Output Layer Set
PH Picture Header
POC Picture Order Count
PPS Picture Parameter Set
PTL Profile, Tier and Level
PU Picture Unit
RAP Random Access Point
RBSP Raw Byte Sequence Payload
SEI Supplemental Enhancement Information
SLI Subpicture Level Information
SPS Sequence Parameter Set
STRP Short-Term Reference Picture
SVC Scalable Video Coding
VCL Video Coding Layer
VPS Video Parameter Set
VTM VVC Test Model
VUI Video Usability Information
VVC Versatile Video Coding

3. Initial Discussion

Video coding standards have evolved primarily through the development of the well-known International Telecommunication Union—Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards. Since H.262, the video coding standards are based on the hybrid video coding structure wherein temporal prediction plus transform coding are utilized. To explore the future video coding technologies beyond HEVC, the Joint Video Exploration Team (WET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion, Final Draft International Standard (FDIS), at the July 2020 meeting.

3.1. Random Access and its Supports in HEVC and VVC

Random access refers to starting access and decoding of a bitstream from a picture that is not the first picture of the bitstream in decoding order. To support tuning in and channel switching in broadcast/multicast and multiparty video conferencing, seeking in local playback and streaming, as well as stream adaptation in streaming, the bitstream needs to include frequent random access points, which are typically intra coded pictures but may also be inter-coded pictures (e.g., in the case of gradual decoding refresh).

HEVC includes signaling of intra random access points (TRAP) pictures in the NAL unit header, through NAL unit types. Three types of TRAP pictures are supported, namely instantaneous decoding refresh (IDR), clean random access (CRA), and broken link access (BLA) pictures. IDR pictures are constraining the inter-picture prediction structure to not reference any picture before the current group-of-pictures (GOP), conventionally referred to as closed-GOP random access points. CRA pictures are less restrictive by allowing certain pictures to reference pictures before the current GOP, all of which are discarded in case of a random access. CRA pictures are conventionally referred to as open-GOP random access points. BLA pictures usually originate from splicing of two bitstreams or part thereof at a CRA picture, e.g., during stream switching. To enable better systems usage of TRAP pictures, altogether six different NAL units are defined to signal the properties of the TRAP pictures, which can be used to better match the stream access point types as defined in the ISO base media file format (ISOBMFF) [7], which are utilized for random access support in dynamic adaptive streaming over HTTP (DASH) [8].

VVC supports three types of TRAP pictures, two types of IDR pictures (one type with or the other type without associated random access decodable leading (RADL) pictures) and one type of CRA picture. These are basically the same as in HEVC. The BLA picture types in HEVC are not included in VVC, mainly due to two reasons: i) The basic functionality of BLA pictures can be realized by CRA pictures plus the end of sequence NAL unit, the presence of which indicates that the subsequent picture starts a new Coded Video Sequence (CVS) in a single-layer bitstream. ii)

There was a desire in specifying less NAL unit types than HEVC during the development of VVC, as indicated by the use of five instead of six bits for the NAL unit type field in the NAL unit header.

Another key difference in random access support between VVC and HEVC is the support of GDR in a more normative manner in VVC. In GDR, the decoding of a bitstream can start from an inter-coded picture and although at the beginning not the entire picture region can be correctly decoded but after a number of pictures the entire picture region would be correct. AVC and HEVC also support GDR, using the recovery point Supplemental Enhancement Information (SEI) message for signaling of GDR random access points and the recovery points. In VVC, a new NAL unit type is specified for indication of GDR pictures and the recovery point is signaled in the picture header syntax structure. A CVS and a bitstream are allowed to start with a GDR picture. This means that it is allowed for an entire bitstream to contain only inter-coded pictures without a single intra-coded picture. The main benefit of specifying GDR support this way is to provide a conforming behavior for GDR. GDR enables encoders to smooth the bit rate of a bitstream by distributing intra-coded slices or blocks in multiple pictures as opposed intra coding entire pictures, thus allowing significant end-to-end delay reduction, which is considered more important nowadays than before as ultralow delay applications like wireless display, online gaming, drone based applications become more popular.

Another GDR related feature in VVC is the virtual boundary signaling. The boundary between the refreshed region (i.e., the correctly decoded region) and the unrefreshed region at a picture between a GDR picture and its recovery point can be signaled as a virtual boundary, and when signaled, in-loop filtering across the boundary would not be applied, thus a decoding mismatch for some samples at or near the boundary would not occur. This can be useful when the application determines to display the correctly decoded regions during the GDR process.

IRAP pictures and GDR pictures can be collectively referred to as random access point (RAP) pictures.

3.2. Picture Resolution Change within a Sequence

In AVC and HEVC, the spatial resolution of pictures cannot change unless a new sequence using a new sequence parameter set (SPS) starts, with an TRAP picture. VVC enables picture resolution change within a sequence at a position without encoding an TRAP picture, which is always intra-coded. This feature is sometimes referred to as reference picture resampling (RPR), as the feature needs resampling of a reference picture used for inter prediction when that reference picture has a different resolution than the current picture being decoded.

The scaling ratio is restricted to be larger than or equal to ½ (2 times downsampling from the reference picture to the current picture), and less than or equal to 8 (8 times upsampling). Three sets of resampling filters with different frequency cutoffs are specified to handle various scaling ratios between a reference picture and the current picture. The three sets of resampling filters are applied respectively for the scaling ratio ranging from ½ to 1/1.75, from 1/1.75 to 1/1.25, and from 1/1.25 to 8. Each set of resampling filters has 16 phases for luma and 32 phases for chroma which is same to the case of motion compensation interpolation filters. Actually the normal MC interpolation process is a special case of the resampling process with scaling ratio ranging from 1/1.25 to 8. The horizontal and vertical scaling ratios are derived based on picture width and height, and the left, right, top and bottom scaling offsets specified for the reference picture and the current picture.

Other aspects of the VVC design for support of this feature that are different from HEVC include: i) The picture resolution and the corresponding conformance window are signaled in the Picture Parameter Set (PPS) instead of in the SPS, while in the SPS the maximum picture resolution is signaled. ii) For a single-layer bitstream, each picture store (a slot in the Decoded Picture Buffer (DPB) for storage of one decoded picture) occupies the buffer size as required for storing a decoded picture having the maximum picture resolution.

3.3. Scalable Video Coding (SVC) in General and in VVC

Scalable video coding (SVC, sometimes also just referred to as scalability in video coding) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the Multiview or 3D extension of the HEVC standard, there may be multiple views, and information of one view may be utilized to code (e.g., encode or decode) the information of another view (e.g., motion estimation, motion vector prediction and/or other redundancies).

In SVC, the parameters used by the encoder or the decoder are grouped into parameter sets based on the coding level (e.g., video-level, sequence-level, picture-level, slice level, etc.) in which they may be utilized. For example, parameters that may be utilized by one or more coded video sequences of different layers in the bitstream may be included in a video parameter set (VPS), and parameters that are utilized by one or more pictures in a coded video sequence may be included in a sequence parameter set (SPS). Similarly, parameters that are utilized by one or more slices in a picture may be included in a picture parameter set (PPS), and other parameters that are specific to a single slice may be included in a slice header. Similarly, the indication of which parameter set(s) a particular layer is using at a given time may be provided at various coding levels.

Thanks to the support of reference picture resampling (RPR) in VVC, support of a bitstream containing multiple layers, e.g., two layers with standard definition (SD) and high definition (HD) resolutions in VVC can be designed without the need any additional signal-processing-level coding tool, as upsampling needed for spatial scalability support can just use the RPR upsampling filter. Nevertheless, high-level syntax changes (compared to not supporting scalability) are needed for scalability support. Scalability support is specified in VVC version 1. Different from the scalability supports in any earlier video coding standards, including in extensions of AVC and HEVC, the design of VVC scalability has been made friendly to single-layer decoder designs as much as possible. The decoding capability for multi-layer bitstreams are specified in a manner as if there were only a single layer in the bitstream. E.g., the decoding capability, such as DPB size, is specified in a manner that is independent of the number of layers in the bitstream to be decoded. Basically, a decoder designed for single-layer bitstreams does not need much change to be able to decode multi-layer bitstreams. Compared to the designs of multi-layer extensions of AVC and HEVC, the high level syntax (HLS) aspects have been significantly simplified at the sacrifice of some flexibilities. For example, an IRAP AU is required to contain a picture for each of the layers present in the CVS.

3.4. Parameter Sets

AVC, HEVC, and VVC specify parameter sets. The types of parameter sets include SPS, PPS, Adaptation Parameter Set (APS), and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signalling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

4. Technical Problems Addressed by Disclosed Technical Solutions

The latest designs of POC, GDR, EOS, and still picture profiles in VVC have the following problems:

1) It is required that phpoc_msb_cyclepresent flag shall be to equal to 0 when vps_independent_layer_flag[GeneralLayerIdx[nuh_layer_id] ] is equal to 0 and there is a picture in the current AU in a reference layer of the current layer. However, such a picture in a reference layer could be removed by the general sub-bitstream extraction process specified in clause C.6. Consequently, the POC derivation won't be correct.
2) The value of phpoc_msb_cyclepresent flag is used in the POC derivation process, while the flag may be not present and there is no value inferred in that case.
3) The GDR feature mainly useful used low end-to-end delay applications. Therefore, it'd make sense to disallow its use when the bitstream is encoded in a way that is not suitable for low end-to-end delay applications.
4) When EOS NAL unit for a layer is present in an AU of a multi-layer bitstream, that would mean there has been a seeking operation to jump to this AU, or this AU is a bitstream splicing point. For either of the two situations, it does not make sense that this layer is not continuous for the same content while in another layer of the same bitstream the content is continuous, regardless of whether there is inter-layer dependency between the layers.
5) It is possible to have a bitstream that has no picture to output. That should be disallowed, either generally for all profiles, or just for the still picture profiles.

5. A Listing of Embodiments and Solutions

To solve the above problems, and others, methods as summarized below are disclosed. The items should be considered as examples to explain the general concepts and should not be interpreted in a narrow way. Furthermore, these items can be applied individually or combined in any manner.

1) To solve problem 1, instead of requiring phpoc_msb_cycle_present_flag to equal to 0 when vps_independent_layer_flag[GeneralLayerIdx[nuh_layer_id] ] is equal to 0 and there is a picture in the current AU in a reference layer of the current layer, the value of phpoc_msb_cycle_present_flag may be required to be equal to 0 under a tighter condition.
    a. In one example, the value of phpoc_msb_cycle_present_flag is be required to be equal to 0 when vps_independent_layer_flag[GeneralLayerIdx[nuh_layer_id] ] is equal to 0 and there is an Inter-Layer Reference Picture (ILRP) entry in RefPicList[0] or RefPicList[1] of a slice of the current picture.
    b. In one example, the value of phpoc_msb_cycle_present_flag is be required to be equal to 0 when vps_independent_layer_flag[GeneralLayerIdx[nuh_layer_id] ] is equal to 0 and there is a picture with nuh_layer_id equal to refpicLayerId that is in the current AU in a reference layer of the current layer and has TemporalId less than or equal to Max(0, vps_max_tid_refpics_plus1[currLayerIdx][refLayerIdx]−1), where currLayerIdx and refLayerIdx are equal to GeneralLayerIdx[nuh_layer_id] and GeneralLayerIdx[refpicLayerId], respectively.
    c. In one example, the value of phpoc_msb_cycle_present_flag is never required to be equal to 0.
2) To solve problem 2, instead of use "phpoc_msb_cycle_present_flag is equal to 1 (0)" in the POC derivation process, use "phpoc_msb_cycle_val is present (not present)".
3) To solve problem 3, it is assumed that GDR pictures are only used for in low end-to-end delay applications, and GDR pictures may be disallowed when the output order and decoding order of AUs are different.
    a. In one example, it is required that, when sps_gdr_enabled_flag is equal to 1, the decoding order and the output order of all pictures in the CLVS shall be the same. Note that this constraint would also mandate that the decoding order and output order of AUs are the same in multi-layer bitstreams, because all pictures within an AU are required to be contiguous in decoding order, and all pictures within an AU have the same output order.
    b. In one example, it is required that, when sps_gdr_enabled_flag is equal to 1 for an SPS referenced by a picture in a CVS, the decoding order and the output order of all AUs in the CVS shall be the same.
    c. In one example, it is required that, when sps_gdr_enabled_flag is equal to 1 for an SPS referenced by a picture, the decoding order and the output order of all AUs in the bitstream shall be the same.
    d. In one example, it is required that, when sps_gdr_enabled_flag is equal to 1 for an SPS present in the bitstream, the decoding order and the output order of all AUs in the bitstream shall be the same.
    e. In one example, it is required that, when sps_gdr_enabled_flag is equal to 1 for an SPS for the bitstream (provided by being in the bitstream or through an external means), the decoding order and the output order of all AUs in the bitstream shall be the same.

4) To solve problem 4, when EOS NAL unit for a layer is present in an AU of a multi-layer bitstream, it is required that the next picture in each of all or certain higher layers to be a CLVSS picture.
   a. In one example, it is specified that, when an AU auA contains an EOS NAL unit in a layer layerA, for each layer layerB that is present in the CVS and has layerA as a reference layer, the first picture in layerB in decoding order in an AU following auA in decoding order shall be a CLVSS picture.
   b. In one example, alternatively, it is specified that, when an AU auA contains an EOS NAL unit in a layer layerA, for each layer layerB that is present in the CVS and is a higher layer than layerA, the first picture in layerB in decoding order in an AU following auA in decoding order shall be a CLVSS picture.
   c. In one example, alternatively, it is specified that, when one picture in an AU auA is a CLVSS picture that is a CRA or GDR picture, for each layer layerA present in the CVS, if there is a picture picA for layerA in auA, picA shall be a CLVSS picture, otherwise (there is no picture for layerA in auA), the first picture in decoding order for layerA in an AU following auA in decoding order shall be a CLVSS picture.
   d. In one example, alternatively, it is specified that, when a picture in a layer layerB in an AU auA is a CLVSS picture that is a CRA or GDR picture, for each layer layerA present in the CVS that is higher than layerB, if there is a picture picA for layerA in auA, picA shall be a CLVSS picture, otherwise (there is no picture for layerA in auA), the first picture in decoding order for layerA in an AU following auA in decoding order shall be a CLVSS picture.
   e. In one example, alternatively, it is specified that, when a picture in a layer layerB in an AU auA is a CLVSS picture that is a CRA or GDR picture, for each layer layerA present in the CVS that has layerB as a reference layer, if there is a picture picA for layerA in auA, picA shall be a CLVSS picture, otherwise (there is no picture for layerA in auA), the first picture in decoding order for layerA in an AU following auA in decoding order shall be a CLVSS picture.
   f. In one example, alternatively, it is specified that, when there is an EOS NAL unit in an AU, there shall be an EOS NAL unit in the AU for each layer present in the CVS.
   g. In one example, alternatively, it is specified that, when there is an EOS NAL unit in layer layerB in an AU, there shall be an EOS NAL unit in the AU for each layer present in the CVS that is higher than layerB.
   h. In one example, alternatively, it is specified that, when there is an EOS NAL unit in layer layerB in an AU, there shall be an EOS NAL unit in the AU for each layer present in the CVS that has layerB as a reference layer.
   i. In one example, alternatively, it is specified that, when a picture in an AU is a CLVSS picture that is a CRA or GDR picture, all pictures in the AU shall be CLVSS pictures.
   j. In one example, alternatively, it is specified that, when a picture in a layer layerB in an AU is a CLVSS picture that is a CRA or GDR picture, the pictures in the AU in all layers that are higher than layerB shall be CLVSS pictures.
   k. In one example, alternatively, it is specified that, when a picture in a layer layerB in an AU is a CLVSS picture that is a CRA or GDR picture, the pictures in the AU in all layers that have layerB as a reference layer shall be CLVSS pictures.
   l. In one example, alternatively, it is specified that, when a picture in an AU is a CLVSS picture that is a CRA or GDR picture, the AU shall have a picture for each layer present in the CVS, and all pictures in the AU shall be CLVSS pictures.
   m. In one example, alternatively, it is specified that, when a picture in a layer layerB in an AU is a CLVSS picture that is a CRA or GDR picture, the AU shall have a picture for each layer higher than layerB present in the CVS, and all pictures in the AU shall be CLVSS pictures.
   n. In one example, alternatively, it is specified that, when a picture in a layer layerB in an AU is a CLVSS picture that is a CRA or GDR picture, the AU shall have a picture for each layer having layerB as a reference layer present in the CVS, and all pictures in the AU shall be CLVSS pictures.
5) To solve problem 5, it is specified that a bitstream shall have at least one picture that is output.
   a. In one example, it is specified that, when a bitstream contains only one picture, the picture shall have ph_pic_output_flag equal to 1.
   b. In one example, it is specified that a bitstream shall have at least one picture that is in an output layer and has ph_pic_output_flag equal to 1.
   c. In examples, either of the above constraints is specified as part of the definition of one or more still picture profiles, e.g., the Main 10 Still Picture profile and the Main 4:4:4 10 Still Picture profile.
   d. In examples, either of the above constraints is specified not part of the definition of a profile, such that it applies to any profile.

6. Embodiments

Below are some example embodiments for some of the invention aspects summarized above in Section 5, which can be applied to the VVC specification. The changed texts are based on the latest VVC text in WET-S0152-v5. Most relevant parts that have been added or modified are bolded, underlined and italicized, e.g., "using A *and B* ", and some of the deleted parts are italicized and enclosed with bolded double brackets, e.g., "based on [[*A and* ]]B ".

6.1. First Embodiment

This embodiment is for items 1 to 5 and some of their sub-items.

7.4.3.7 Picture header structure semantics ph_poc_msb_cycle_present_flag equal to 1 specifies that the syntax element phpoc_msb_cycle_val is present in the picture header (PH). phpoc_msb_cycle_present_flag equal to 0 specifies that the syntax element phpoc_msb_cycle_val is not present in the PH. When vps_independent_layer_flag[GeneralLayerIdx[nuh_layer_id] ] is equal to 0 and there is *an ILRP entry in RefPicList[ 0 ] or RefPicList[ 1 ] of a slice of the current picture* , the value of ph_poc_msb_cycle_present_flag shall be equal to 0.

. . .

ph_pic_output_flag affects the decoded picture output and removal processes as specified in Annex C. When ph_pic_output_flag is not present, it is inferred to be equal to 1.

*It is a requirement of bitstream conformance that there shall be at least one picture in the bitstream that is in an output layer and has ph_ pic_output_ flag equal to 1.*
  NOTE 5— There is no picture in the bitsteam that has ph_non_ref_pic_flag equal to 1 and ph_pic_output_flag equal to 0.
8.3.1 Decoding Process for Picture Order Count
  When *ph_poc_msb_cycle* v *_val is not present* and the current picture is not a CLVSS picture, the variables prevPicOrderCntLsb and prevPicOrderCntMsb are derived as follows:
  Let prevTid0Pic be the previous picture in decoding order that has nuh_layer_id equal to the nuh_layer_id of the current picture, has TemporalId and ph_non_ref_ pic_flag both equal to 0, and is not a random access skipped leading (RASL) or RADL picture.
  The variable prevPicOrderCntLsb is set equal to ph_pic_order_cnt_lsb of prevTid0Pic.
  The variable prevPicOrderCntMsb is set equal to PicOrderCntMsb of prevTid0Pic.
The variable PicOrderCntMsb of the current picture is derived as follows:
  If *ph_poc_msb_cycle_ val is present* , PicOrderCntMsb is set equal to ph_poc_msb_cycle_val * MaxPicOrderCntLsb.
  Otherwise ( *ph_poc_msb_cycle_ val is not present* ), if the current picture is a CLVSS picture, PicOrderCntMsb is set equal to 0.
. . .
7.4.3.3 Sequence parameter set Raw Byte Sequence Payload (RBSP) semantics
. . .
sps_gdr_enabled_flag equal to 1 specifies that GDR pictures are enabled and may be present in the CLVS. sps_gdr_enabled_flag equal to 0 specifies that GDR pictures are disabled and not present in the CLVS.
*When sps_gdr_enabled_ flag is equal to 1 the decoding order and the output order of all pictures in the CLVS shall be the same.*
*NOTE - Note that the above constraint also mandates that the decoding order and output order of the AUs containing pictures of the CLVS are the same in multi-layer bitstreams, because all pictures within an AU are required to be contiguous in decoding order, , and all pictures within an AU have the same output order.*
. . .
7.4.3.10 End of sequence RBSP semantics
. . .
*When an AU auA contains an EOS NAL unit in a layer layerA, for each layer layerB that is present in the CVS and has layerA as a reference layer, the first picture in layerB in decoding order in an AU following auA in decoding order shall be a CLVSS picture.*
. . .

FIG. 1 is a block diagram showing an example video processing system 1000 in which various techniques disclosed herein may be implemented. Various implementations may include some or all of the components of the system 1000. The system 1000 may include input 1002 for receiving video content. The video content may be received in a raw or uncompressed format, e.g., 8 or 10 bit multi-component pixel values, or may be in a compressed or encoded format. The input 1002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1000 may include a coding component 1004 that may implement the various coding or encoding methods described in the present document. The coding component 1004 may reduce the average bitrate of video from the input 1002 to the output of the coding component 1004 to produce a coded representation of the video. The coding techniques are therefore sometimes called video compression or video transcoding techniques. The output of the coding component 1004 may be either stored, or transmitted via a communication connected, as represented by the component 1006. The stored or communicated bitstream (or coded) representation of the video received at the input 1002 may be used by the component 1008 for generating pixel values or displayable video that is sent to a display interface 1010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 2:
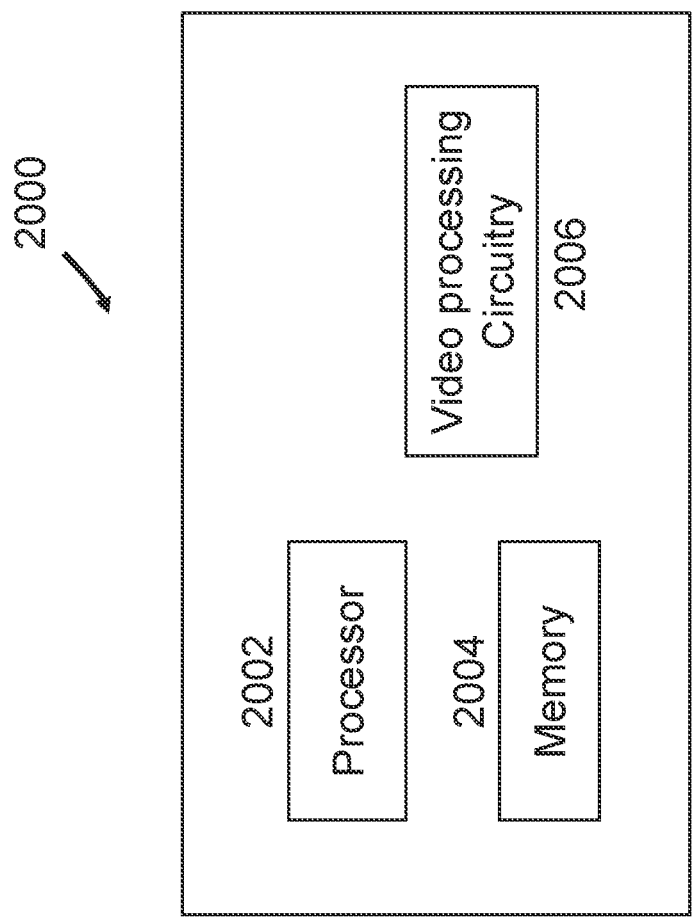
FIG. 2 is a block diagram of an example hardware platform used for video processing.

FIG. 2 is a block diagram of a video processing apparatus 2000. The apparatus 2000 may be used to implement one or more of the methods described herein. The apparatus 2000 may be embodied in a smartphone, tablet, computer, Internet of Things (IoT) receiver, and so on. The apparatus 2000 may include one or more processors 2002, one or more memories 2004 and video processing hardware 2006. The processor(s) 2002 may be configured to implement one or more methods described in the present document (e.g., in FIGS. 6-9). The memory (memories) 2004 may be used for storing data and code used for implementing the methods and techniques described herein. The video processing hardware 2006 may be used to implement, in hardware circuitry, some techniques described in the present document. In some embodiments, the hardware 2006 may be partly or entirely in the one or more processors 2002, e.g., a graphics processor.

Figure 3:
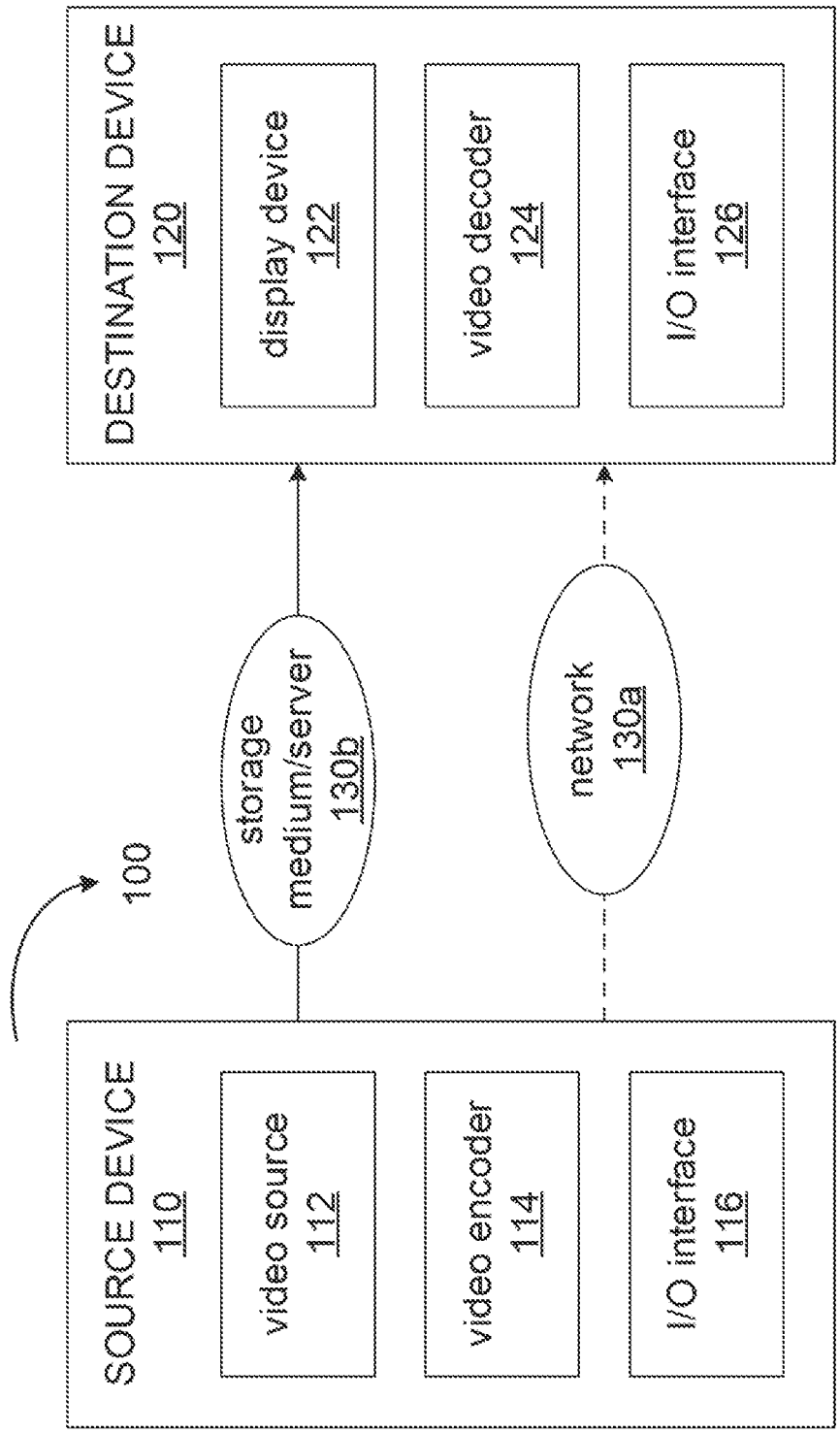
FIG. 3 is a block diagram that illustrates an example video coding system that can implement some embodiments of the present disclosure.

FIG. 3 is a block diagram that illustrates an example video coding system 100 that may utilize the techniques of this disclosure. As shown in FIG. 3, video coding system 100 may include a source device 110 and a destination device 120. Source device 110 generates encoded video data which may be referred to as a video encoding device. Destination device 120 may decode the encoded video data generated by source device 110 which may be referred to as a video decoding device. Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources.

The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding(VVM) standard and other current and/or further standards.

Figure 4:
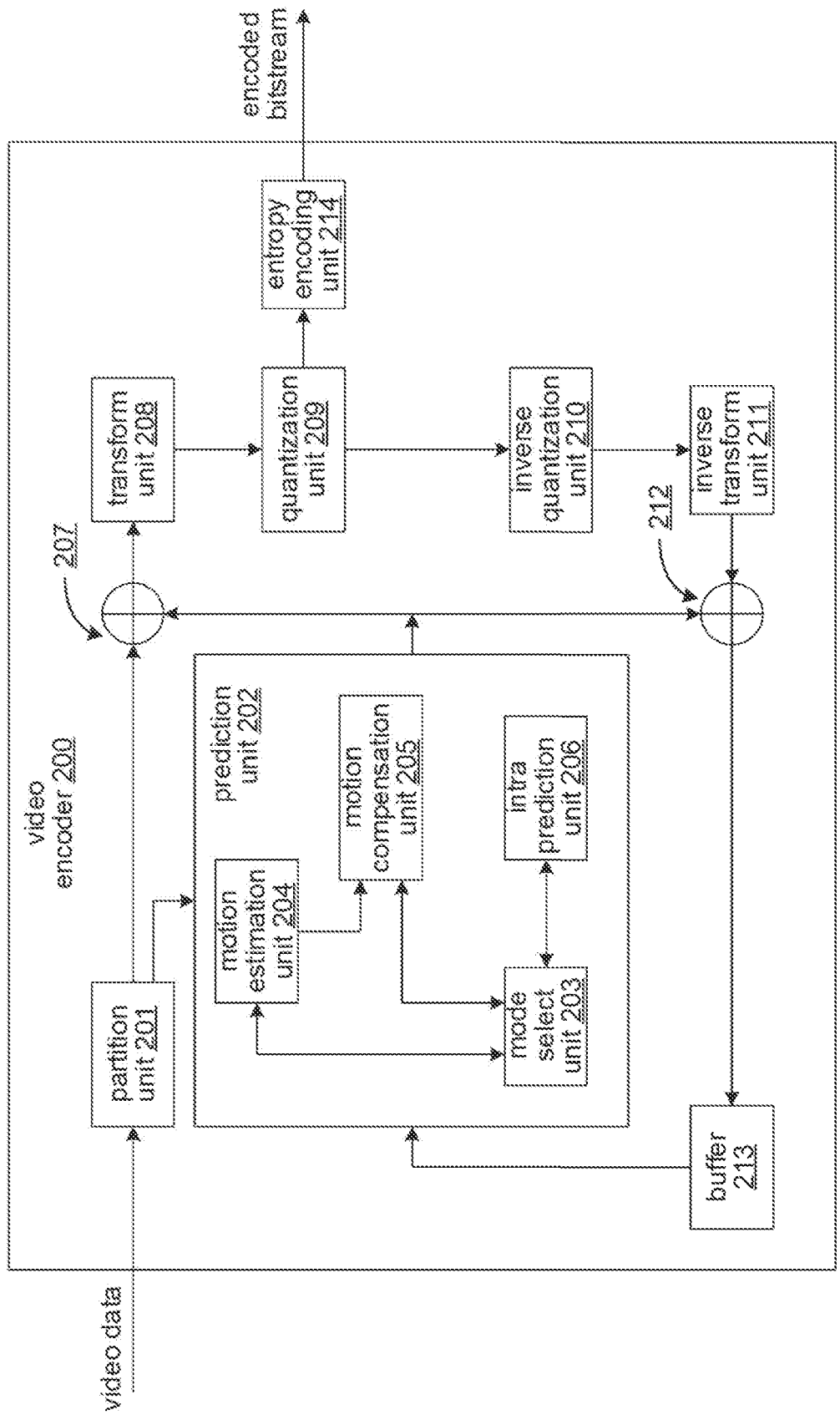
FIG. 4 is a block diagram that illustrates an example of an encoder that can implement some embodiments of the present disclosure.

FIG. 4 is a block diagram illustrating an example of video encoder 200, which may be video encoder 114 in the system 100 illustrated in FIG. 3.

Video encoder 200 may be configured to perform any or all of the techniques of this disclosure. In the example of FIG. 4, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy(IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 4 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 5:
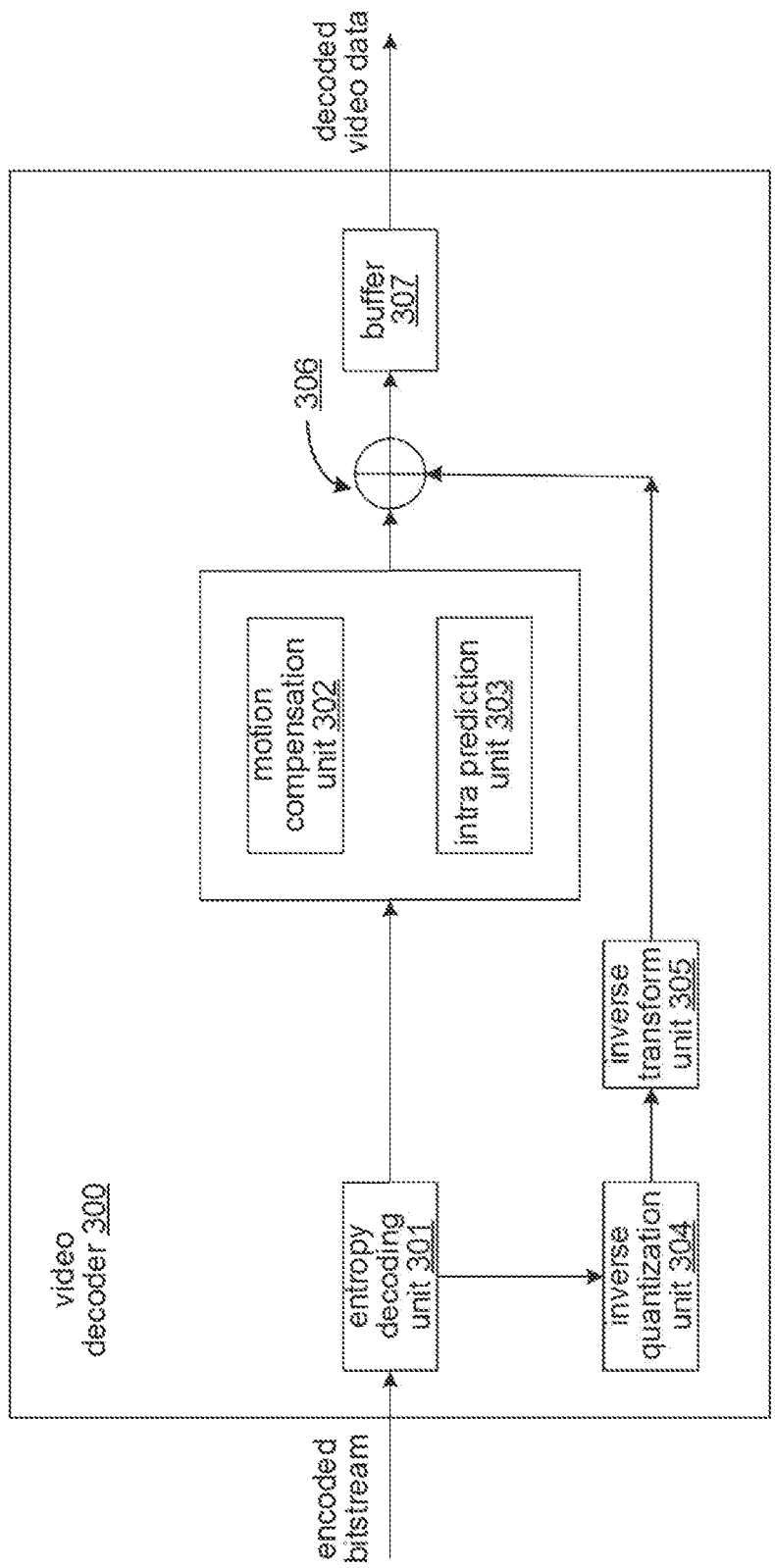
FIG. 5 is a block diagram that illustrates an example of a decoder that can implement some embodiments of the present disclosure.

FIG. 5 is a block diagram illustrating an example of video decoder 300 which may be video decoder 124 in the system 100 illustrated in FIG. 3.

The video decoder 300 may be configured to perform any or all of the techniques of this disclosure. In the example of FIG. 5, the video decoder 300 includes a plurality of functional components. The techniques described in this disclosure may be shared among the various components of the video decoder 300. In some examples, a processor may be configured to perform any or all of the techniques described in this disclosure.

In the example of FIG. 5, video decoder 300 includes an entropy decoding unit 301, a motion compensation unit 302, an intra prediction unit 303, an inverse quantization unit 304,an inverse transformation unit 305, and a reconstruction unit 306 and a buffer 307. Video decoder 300 may, in some examples, perform a decoding pass generally reciprocal to the encoding pass described with respect to video encoder 200 (FIG. 4).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

FIGS. 6-11 show example methods that can implement the technical solution described above in, for example, the embodiments shows in FIGS. 1-5.

Figure 6:
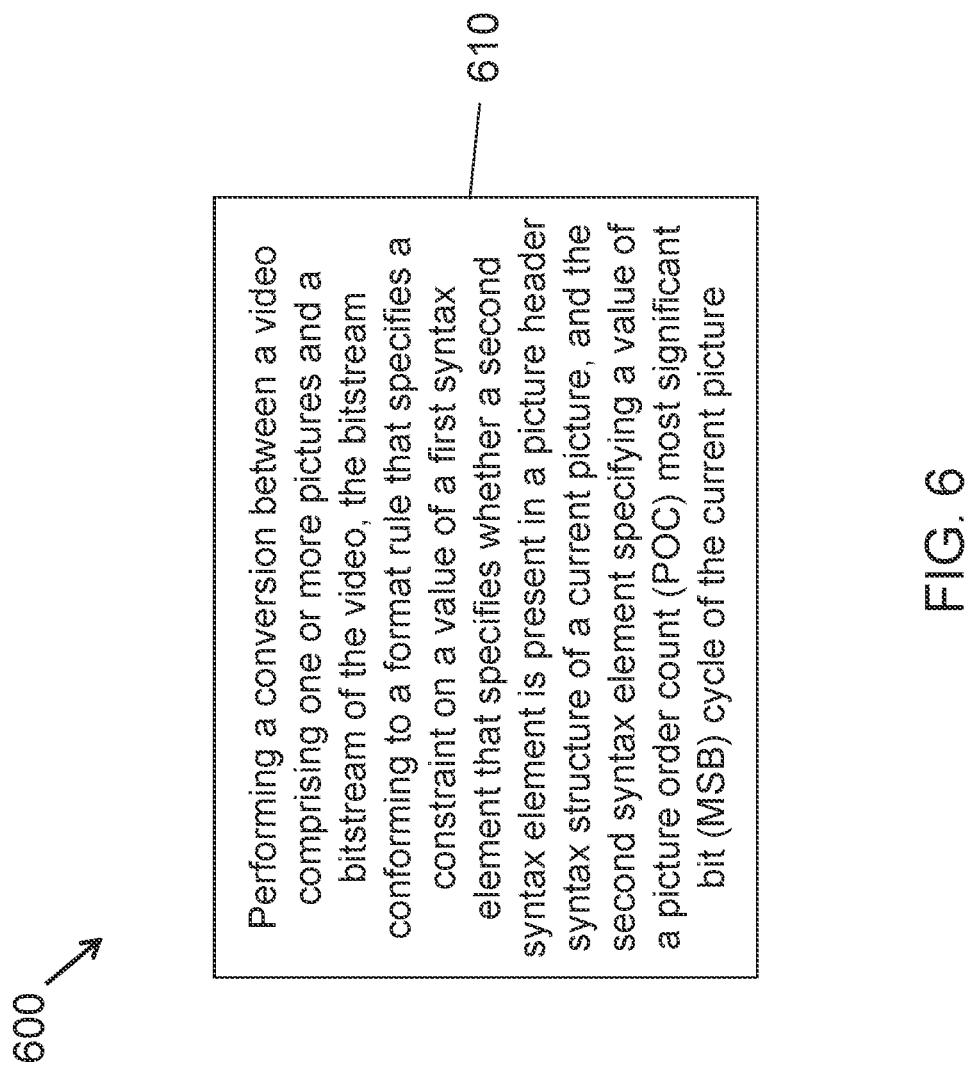
FIGS. 6-11 show flowcharts for example methods of video processing.

FIG. 6 shows a flowchart for an example method 600 of video processing. The method 600 includes, at operation 610, performing a conversion between a video comprising one or more pictures and a bitstream of the video, the bitstream conforming to a format rule that specifies a constraint on a value of a first syntax element that specifies whether a second syntax element is present in a picture header syntax structure of a current picture, and the second syntax element specifying a value of a picture order count (POC) most significant bit (MSB) cycle of the current picture.

Figure 7:
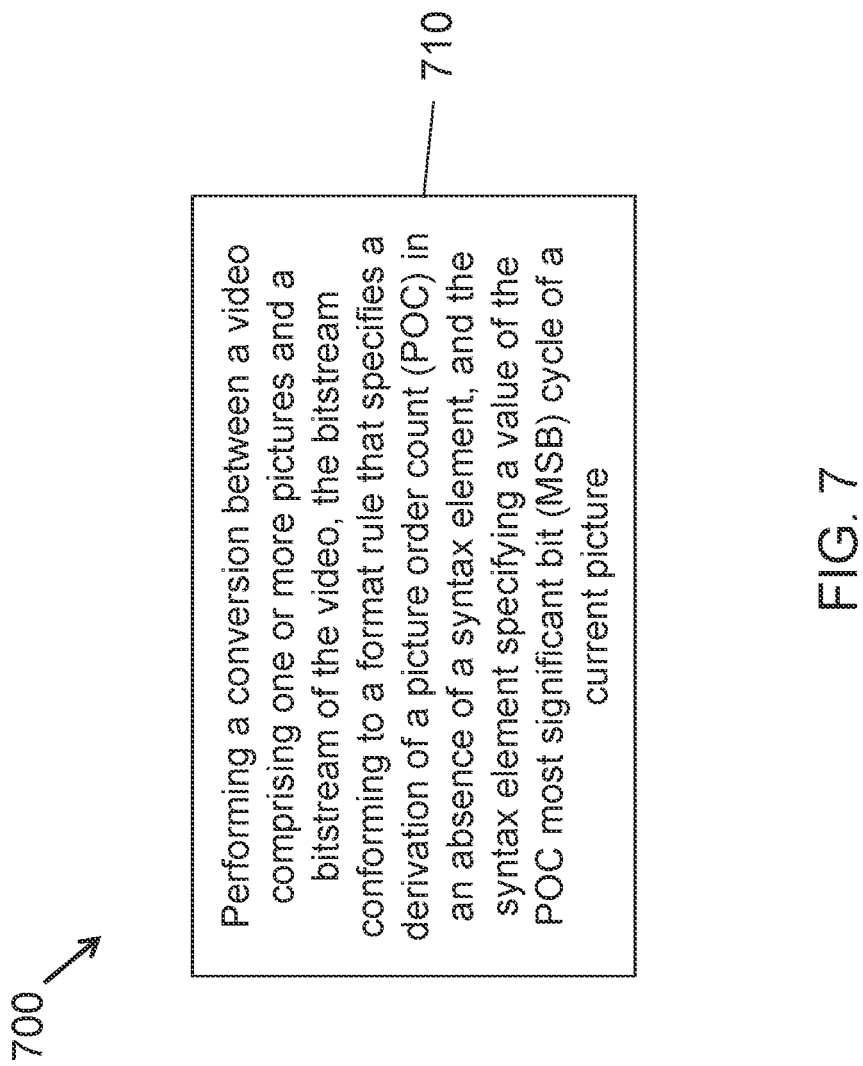

FIG. 7 shows a flowchart for an example method 700 of video processing. The method 700 includes, at operation 710, performing a conversion between a video comprising one or more pictures and a bitstream of the video, the bitstream conforming to a format rule that specifies a derivation of a picture order count (POC) in an absence of a syntax element, and the syntax element specifying a value of the POC most significant bit (MSB) cycle of a current picture.

Figure 8:
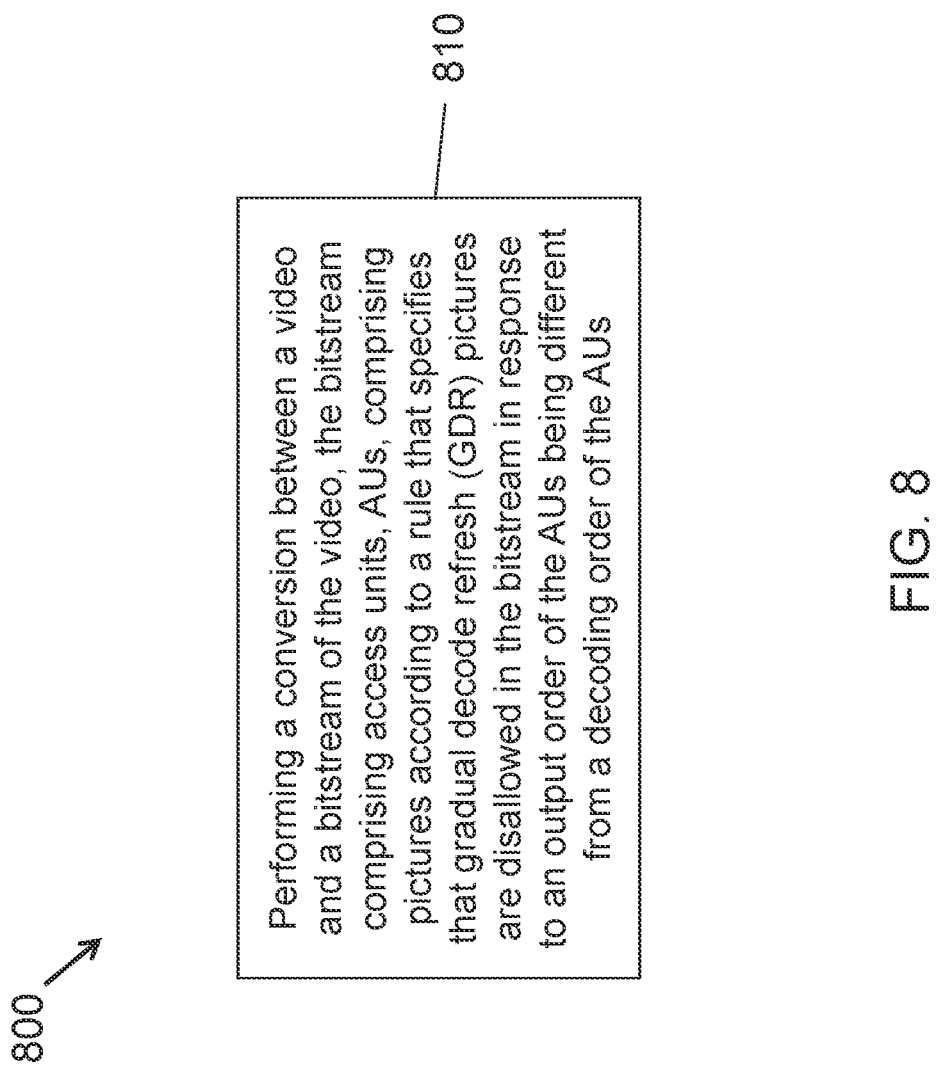

FIG. 8 shows a flowchart for an example method 800 of video processing. The method 800 includes, at operation 810, performing a conversion between a video and a bitstream of the video, the bitstream comprising access units, AUs, comprising pictures according to a rule that specifies that gradual decode refresh (GDR) pictures are disallowed in the bitstream in response to an output order of the AUs being different from a decoding order of the AUs.

Figure 9:
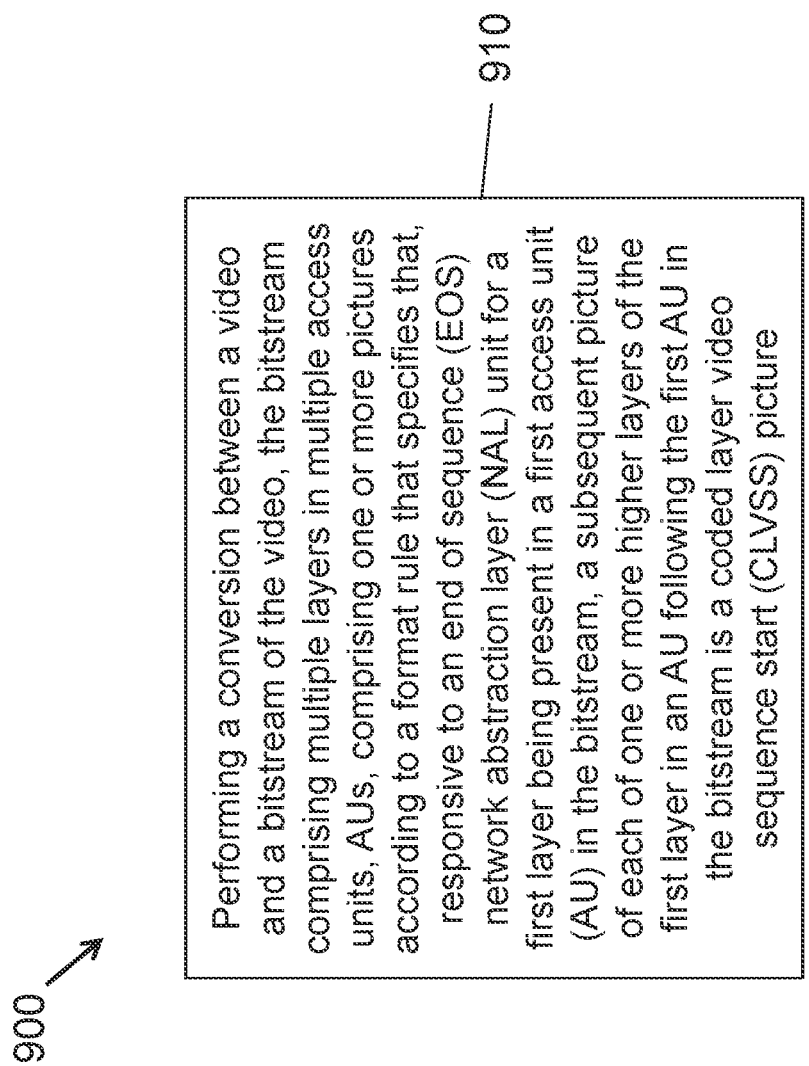

FIG. 9 shows a flowchart for an example method 900 of video processing. The method 900 includes, at operation 910, performing a conversion between a video and a bitstream of the video, the bitstream comprising multiple layers in multiple access units, AUs, comprising one or more pictures according to a format rule that specifies that, responsive to an end of sequence (EOS) network abstraction layer (NAL) unit for a first layer being present in a first access unit (AU) in the bitstream, a subsequent picture of each of one or more higher layers of the first layer in an AU following the first AU in the bitstream is a coded layer video sequence start (CLVSS) picture.

Figure 10:
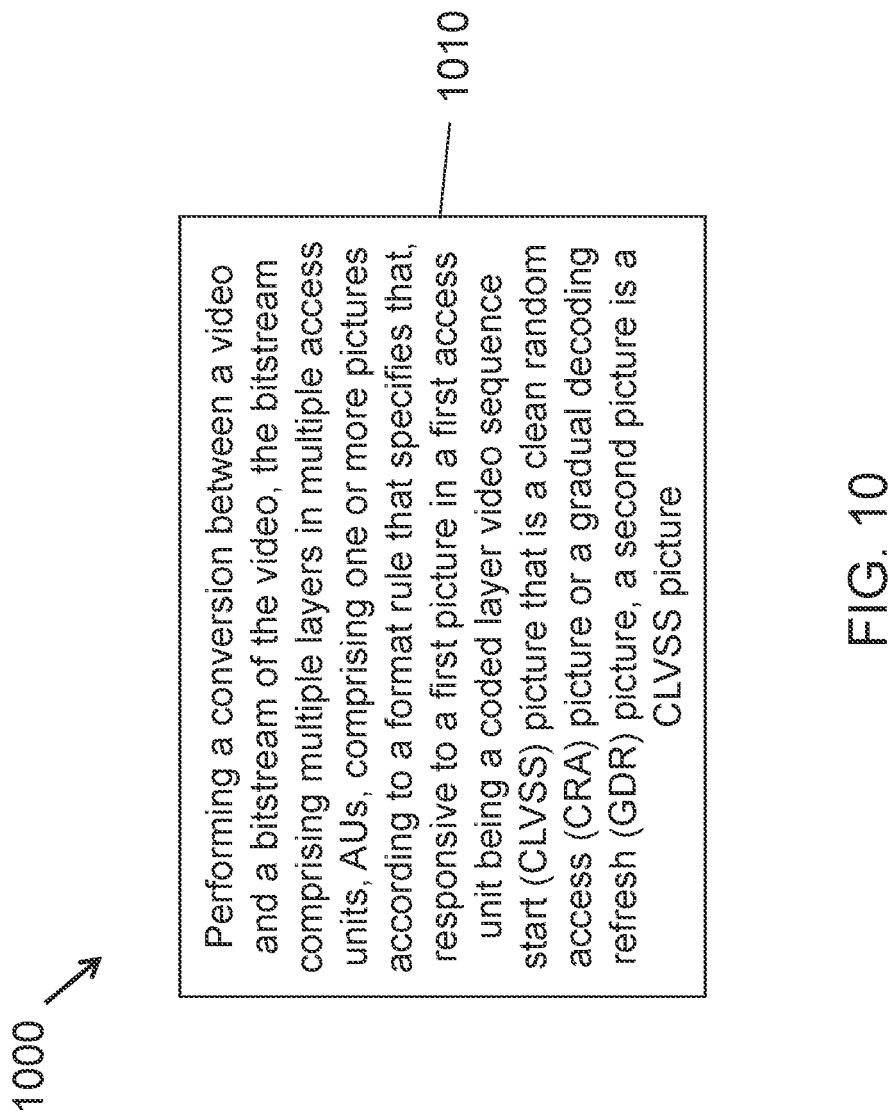

FIG. 10 shows a flowchart for an example method 1000 of video processing. The method 1000 includes, at operation 1010, performing a conversion between a video and a bitstream of the video, the bitstream comprising multiple layers in multiple access units, AUs, comprising one or more pictures according to a format rule that specifies that, responsive to a first picture in a first access unit being a coded layer video sequence start (CLVSS) picture that is a clean random access (CRA) picture or a gradual decoding refresh (GDR) picture, a second picture is a CLVSS picture.

Figure 11:
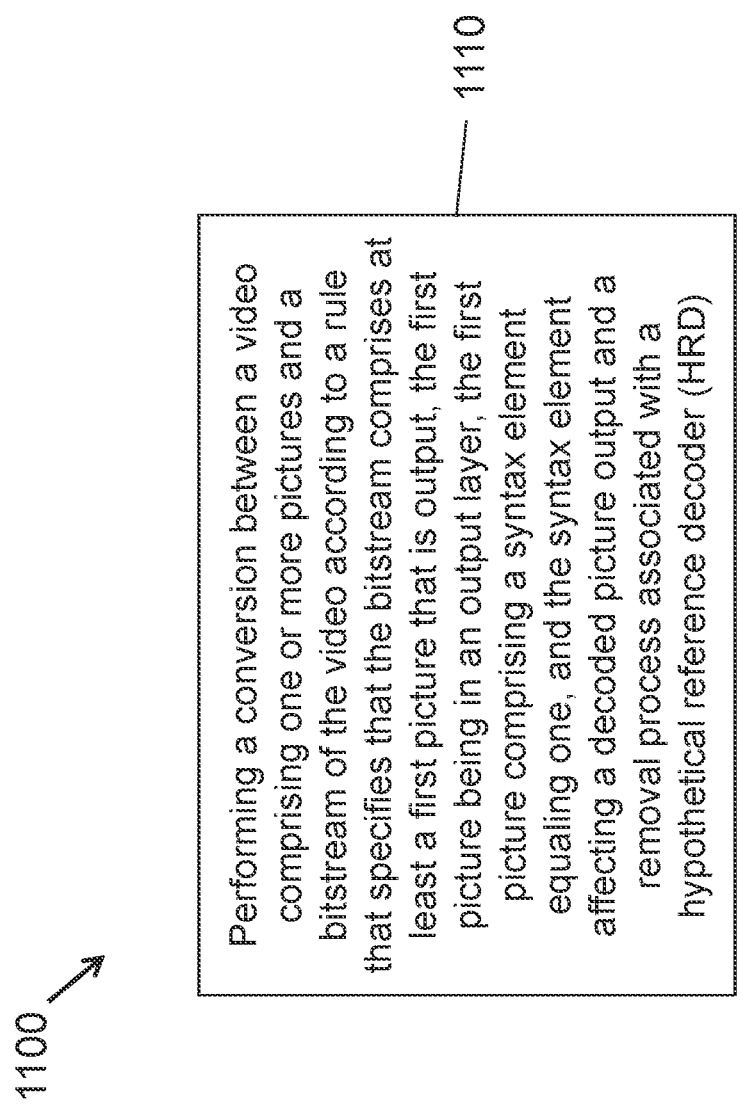

FIG. 11 shows a flowchart for an example method 1100 of video processing. The method 1100 includes, at operation 1110, performing a conversion between a video comprising one or more pictures and a bitstream of the video according to a rule that specifies that the bitstream comprises at least a first picture that is output, the first picture being in an output layer, the first picture comprising a syntax element equaling one, and the syntax element affecting a decoded picture output and a removal process associated with a hypothetical reference decoder (HRD).

The following solutions show example embodiments of techniques discussed in the previous section (e.g., items 1-5).

A listing of solutions preferred by some embodiments is provided next.

A1. A method of video processing, comprising performing a conversion between a video comprising one or more pictures and a bitstream of the video, wherein the bitstream conforms to a format rule, wherein the format rule specifies a constraint on a value of a first syntax element that specifies whether a second syntax element is present in a picture header syntax structure of a current picture, and wherein the second syntax element specifies a value of a picture order count (POC) most significant bit (MSB) cycle of the current picture.

A2. The method of solution A1, wherein the value of the first syntax element is equal to zero in response to a value of a flag equaling zero and an inter-layer reference picture (ILRP) entry being in a reference picture list of a slice of the current picture, and wherein the flag specifies whether an indexed layer uses inter-layer prediction.

A3. The method of solution A2, wherein the reference picture list comprises a first reference picture list (RefPicList[0]) or a second reference picture list (RefPicList[1]).

A4. The method of solution A2, wherein the value of the first syntax element equaling zero specifies that the second syntax element is not present in the picture header syntax structure.

A5. The method of solution A2, wherein the value of the flag equaling zero specifies that the indexed layer is allowed to use the inter-layer prediction.

A6. The method of solution A1, wherein the value of the first syntax element is equal to zero in response to a value of a flag equaling zero and a picture having (i) a first identifier that is equal to a second identifier that is in a current access unit (AU) in a reference layer of a current layer and (ii) a third identifier that is less than or equal to a threshold, wherein the flag specifies whether an indexed layer uses inter-layer prediction, wherein the first identifier specifies a layer to which a video coding layer (VCL) network abstraction layer (NAL) unit belongs, wherein the second identifier specifies a layer to which a reference picture belongs, wherein the third identifier is a temporal identifier, and wherein the threshold is based on a second syntax element that specifies whether pictures in an indexed layer that are neither intra random access pictures (TRAP) pictures nor gradual decoding refresh (GDR) pictures are used as an inter-layer reference picture (IRLP) for decoding a picture in the indexed layer.

A7. The method of solution A6, wherein the first identifier is nuh_layer_id, the second identifier is refpicLayerId, and the third identifier is TemporalId, and wherein the second syntax element is vps_max_tid_il_ref_pics_plus1.

A8. The method of solution A1, wherein the first syntax element is never required to be zero.

A9. The method of any of solutions A2 to A8, wherein the first syntax element is phpoc_msb_cycle_present_flag, the flag is vps_independent_layer_flag, and wherein the second syntax element is phpoc_msb_cycle_val.

A10. A method of video processing, comprising performing a conversion between a video comprising one or more pictures and a bitstream of the video, wherein the bitstream conforms to a format rule, wherein the format rule specifies a derivation of a picture order count (POC) in an absence of a syntax element, and wherein the syntax element specifies a value of the POC most significant bit (MSB) cycle of a current picture.

A11. The method of solution A10, wherein the syntax element is phpoc_msb_cycle_val.

A12. A method of video processing, comprising performing a conversion between a video and a bitstream of the video, wherein the bitstream comprises access units, AUs, comprising pictures according to a rule, wherein the rule specifies that gradual decode refresh (GDR) pictures are disallowed in the bitstream in response to an output order of the AUs being different from a decoding order of the AUs.

A13. The method of solution A12, wherein an output order and a decoding order of all pictures in a coded layer video sequence (CLVS) are identical in response to a flag being equal to one, and wherein the flag specifies whether GDR pictures are enabled.

A14. The method of solution A12, wherein the output order and the decoding order of the AUs are identical in response to a flag being equal to one for a sequence parameter set (SPS) referenced by a picture in a coded video sequence (CVS), and wherein the flag specifies whether GDR pictures are enabled.

A15. The method of solution A12, wherein the output order and the decoding order of the AUs are identical in response to a flag being equal to one for a sequence parameter set (SPS) referenced by a picture, and wherein the flag specifies whether GDR pictures are enabled.

A16. The method of solution A12, wherein the output order and the decoding order of the AUs are identical in response to a flag being equal to one for a sequence parameter set (SPS) in the bitstream, and wherein the flag specifies whether GDR pictures are enabled.

A17. The method of any of solutions A13 to A16, wherein the flag is sps_gdr_enabled_flag.

Another listing of solutions preferred by some embodiments is provided next.

B1. A method of video processing, comprising performing a conversion between a video and a bitstream of the video, wherein the bitstream comprises multiple layers in multiple access units, AUs, comprising one or more pictures according to a format rule, wherein the format rule specifies that, responsive to an end of sequence (EOS) network abstraction layer (NAL) unit for a first layer being present in a first access unit (AU) in the bitstream, a subsequent picture of each of one or more higher layers of the first layer in an AU following the first AU in the bitstream is a coded layer video sequence start (CLVSS) picture.

B2. The method of solution B1, wherein the format rule further specifies that a first picture in a decoding order for a second layer, which is present in a coded video sequence (CVS) that includes the first layer, that uses the first layer as a reference layer is a CLVSS picture.

B3. The method of solution B1, wherein the one or more higher layers comprises all or certain higher layers.

B4. The method of solution B 1, wherein the format rule further specifies that a first picture in a decoding order for a second layer, which is present in a coded video sequence (CVS) that includes the first layer, that is a higher layer than the first layer is a CLVSS picture.

B5. The method of solution B1, wherein the format rule further specifies that the EOS NAL unit is present in each layer of a coded video sequence (CVS) in the bitstream.

B6. The method of solution B1, wherein the format rule further specifies that a second layer, which is present in a coded video sequence (CVS) that includes the first layer, that is a higher layer than the first layer comprises the EOS NAL unit.

B7. The method of solution B1, wherein the format rule further specifies that a second layer, which is present in a coded video sequence (CVS) that includes the first layer, that uses the first layer as a reference layer comprises the EOS NAL unit.

B8. A method of video processing, comprising performing a conversion between a video and a bitstream of the video, wherein the bitstream comprises multiple layers in multiple access units, AUs, comprising one or more pictures according to a format rule, wherein the format rule specifies that, responsive to a first picture in a first access unit being a coded layer video sequence start (CLVSS) picture that is a clean random access (CRA) picture or a gradual decoding refresh (GDR) picture, a second picture is a CLVSS picture.

B9. The method of solution B8, wherein the second picture is a picture for a layer in the first access unit.

B10. The method of solution B8, wherein a first layer comprises the first picture, and wherein the second picture is a picture in a second layer that is higher than the first layer.

B11. The method of solution B8, wherein a first layer comprises the first picture, and wherein the second picture is a picture in a second layer that uses the first layer as a reference layer.

B12. The method of solution B8, wherein the second picture is a first picture in a decoding order in a second access unit that follows the first access unit.

B13. The method of solution B8, wherein the second picture is any picture in the first access unit.

B14. The method of any of solutions B1 to B13, wherein the CLVSS picture is a coded picture that is an (IRAP) picture or a (GDR) picture with a flag that is equal to one, wherein the flag equaling one indicates that an associated picture is not output by a decoder upon a determination that the associated picture comprises references to pictures that are not present in the bitstream.

Yet another listing of solutions preferred by some embodiments is provided next.

C1. A method of video processing, comprising performing a conversion between a video comprising one or more pictures and a bitstream of the video according to a rule, wherein the rule specifies that the bitstream comprises at least a first picture that is output, wherein the first picture is in an output layer, wherein the first picture comprises a syntax element equaling one, and wherein the syntax element affects a decoded picture output and a removal process associated with a hypothetical reference decoder (HRD).

C2. The method of solution C1, wherein the rule applies to all profiles and the bitstream is allowed to conform to any profile.

C3. The method of solution C2, wherein the syntax element is ph_pic_output_flag.

C4. The method of solution C2, wherein the profile is a Main 10 Still Picture profile or a Main 4:4:4 10 Still Picture profile.

The following listing of solutions applies to each of the solutions enumerated above.

O1. The method of any of the preceding solutions, wherein the conversion comprises decoding the video from the bitstream.

O2. The method of any of the preceding solutions, wherein the conversion comprises encoding the video into the bitstream.

O3. A method of storing a bitstream representing a video to a computer-readable recording medium, comprising generating the bitstream from the video according to a method described in any one or more of the preceding solutions, and storing the bitstream in the computer-readable recording medium.

O4. A video processing apparatus comprising a processor configured to implement a method recited in any one or more of claims 1 to 7.

O5. A computer-readable medium having instructions stored thereon, the instructions, when executed, causing a processor to implement a method recited in one or more of the preceding solutions.

O6. A computer readable medium that stores the bitstream generated according to any one or more of the preceding solutions.

O7. A video processing apparatus for storing a bitstream, wherein the video processing apparatus is configured to implement a method recited in any one or more of the preceding solutions.

Yet another listing of solutions preferred by some embodiments is provided next.

P1. A video processing method, comprising performing a conversion between a video comprising one or more pictures and a coded representation of the video, wherein the coded representation conforms to a format rule, wherein the format rule specifies a constraint on a value of a syntax element indicative of presence of a most significant bit cycle for a picture order count in a picture of the video.

P2. The method of solution P1, wherein the format rule specifies that value of syntax element is 0 when an independent value flag is set to a zero value and at least one slice of the picture uses an inter-layer reference picture in a reference list thereof.

P3. The method of any of solutions P1 to P2, wherein the format rule specifies that a zero value of the syntax element is indicated by not including the syntax element in the coded representation.

P4. A video processing method, comprising performing a conversion between a video comprising one or more pictures and a coded representation of the video, wherein the conversion conforms to a rule that specifies that gradual decode refresh pictures are disallowed in case that an output order of an access unit is different from a decoding order of the access unit.

P5. A video processing method, comprising performing a conversion between a video comprising video layers comprising one or more video pictures and a coded representation of the video, wherein the coded representation conforms to a format rule, wherein the format rule specifies that in case that a first network abstraction layer unit (NAL) indicating an end of a video sequence is present in an access unit of a layer, then next pictures of each of higher layers in the coded representation must have a coded layer video sequence start type.

P6. The method of solution P5, wherein the format rule further specifies that a first picture in decoding order for a second layer that uses the layer as a reference layer shall have the coded layer video sequence start type.

P7. The method of any of solutions P1 to P5, wherein the performing the conversion comprises encoding the video to generate the coded representation.

P8. The method of any of solutions P1 to P5, wherein the performing the conversion comprises parsing and decoding the coded representation to generate the video.

P9. A video decoding apparatus comprising a processor configured to implement a method recited in one or more of solutions P1 to P8.

P10. A video encoding apparatus comprising a processor configured to implement a method recited in one or more of solutions P1 to P8.

P11. A computer program product having computer code stored thereon, the code, when executed by a processor, causes the processor to implement a method recited in any of solutions P1 to P8.

In the present document, the term "video processing" may refer to video encoding, video decoding, video compression or video decompression. For example, video compression algorithms may be applied during conversion from pixel representation of a video to a corresponding bitstream representation or vice versa. The bitstream representation (or simply, the bitstream) of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of video processing, comprising:
   performing a conversion between a video and a bitstream of the video,
   wherein the bitstream comprises multiple layers in multiple access units (AUs) comprising one or more pictures according to a first format rule,
   wherein the first format rule specifies that when an end of sequence (EOS) network abstraction layer (NAL) unit for a first layer is present in a first AU in the bitstream, for a second layer that is present in a coded video sequence (CVS) that includes the first layer and uses the first layer as a reference layer, a first picture in the second layer in a decoding order in an AU following the first AU in the bitstream is a coded layer video sequence start (CLVSS) picture, and
   wherein the bitstream conforms to a third format rule, the third format rule specifies that the bitstream comprises at least a first picture that is in an output layer and has a third syntax element equal to one,
   wherein the third syntax element is in a picture header, and wherein the third syntax element affects a decoded picture output and a removal process associated with a hypothetical reference decoder (HRD).

2. The method of claim 1, wherein the second layer is higher than the first layer, and the second layer comprises a certain higher layer.

3. The method of claim 1, wherein the first format rule further specifies that the EOS NAL unit is present in each layer of a coded video sequence (CVS) in the bitstream.

4. The method of claim 1, wherein the conversion comprises decoding the video from the bitstream.

5. The method of claim 1, wherein the conversion comprises encoding the video into the bitstream.

6. An apparatus for processing video data comprising a processor and a non-transitory memory with instructions thereon, wherein the instructions upon execution by the processor, cause the processor to:
   perform a conversion between a video and a bitstream of the video,
   wherein the bitstream comprises multiple layers in multiple access units (AUs) comprising one or more pictures according to a first format rule,
   wherein the first format rule specifies that when an end of sequence (EOS) network abstraction layer (NAL) unit for a first layer is present in a first AU in the bitstream, for a second layer that is present in a coded video sequence (CVS) that includes the first layer and uses the first layer as a reference layer, a first picture in the second layer in a decoding order in an AU following the first AU in the bitstream is a coded layer video sequence start (CLVSS) picture, and
   wherein the bitstream conforms to a third format rule, the third format rule specifies that the bitstream comprises at least a first picture that is in an output layer and has a third syntax element equal to one,
   wherein the third syntax element is in a picture header, and
   wherein the third syntax element affects a decoded picture output and a removal process associated with a hypothetical reference decoder (HRD).

7. The method of claim 1, wherein the bitstream conforms to a second format rule,
wherein the second format rule specifies a constraint on a value of a first syntax element that specifies whether a second syntax element is present in a picture header syntax structure of a current picture, and
wherein the second syntax element specifies a value of a picture order count (POC) most significant bit (MSB) cycle of the current picture.

8. The method of claim 7, wherein the first syntax element is ph_poc_msb_cycle_present_flag, and wherein the second syntax element is ph_poc_msb_cycle_val.

9. The method of claim 7, wherein the value of the first syntax element is equal to zero in response to a value of a flag equaling zero and an inter-layer reference picture (ILRP) entry being in a reference picture list of a slice of the current picture, and wherein the flag specifies whether an indexed layer uses inter-layer prediction.

10. The method of claim 9, the flag is vps_independent_layer_flag.

11. The apparatus of claim 6, wherein the second layer is higher than the first layer, and the second layer comprises a certain higher layer.

12. The apparatus of claim 6, wherein the first format rule further specifies that the EOS NAL unit is present in each layer of a coded video sequence (CVS) in the bitstream.

13. The apparatus of claim 6, wherein the conversion comprises decoding the video from the bitstream.

14. The apparatus of claim 6, wherein the conversion comprises encoding the video into the bitstream.

15. The apparatus of claim 6, wherein the bitstream conforms to a second format rule, wherein the second format rule specifies a constraint on a value of a first syntax element that specifies whether a second syntax element is present in a picture header syntax structure of a current picture, and wherein the second syntax element specifies a value of a picture order count (POC) most significant bit (MSB) cycle of the current picture.

16. The apparatus of claim 15, wherein the first syntax element is ph_poc_msb_cycle_present_flag, and wherein the second syntax element is ph_poc_msb_cycle_val.

17. A non-transitory computer-readable storage medium storing instructions that cause a processor to:
perform a conversion between a video and a bitstream of the video,
wherein the bitstream comprises multiple layers in multiple access units (AUs) comprising one or more pictures according to a first format rule,
wherein the first format rule specifies that when an end of sequence (EOS) network abstraction layer (NAL) unit for a first layer is present in a first AU in the bitstream, for a second layer that is present in a coded video sequence (CVS) that includes the first layer and uses the first layer as a reference layer, a first picture in the second layer in a decoding order in an AU following the first AU in the bitstream is a coded layer video sequence start (CLVSS) picture, and
wherein the bitstream conforms to a third format rule, the third format rule specifies that the bitstream comprises at least a first picture that is in an output layer and has a third syntax element equal to one,
wherein the third syntax element is in a picture header, and
wherein the third syntax element affects a decoded picture output and a removal process associated with a hypothetical reference decoder (HRD).

18. The non-transitory computer-readable storage medium of claim 17, wherein the second layer is higher than the first layer, and the second layer comprises a certain higher layer.

19. The non-transitory computer-readable storage medium of claim 17, wherein the first format rule further specifies that the EOS NAL unit is present in each layer of a coded video sequence (CVS) in the bitstream.

20. A non-transitory computer-readable recording medium storing a bitstream of a video which is generated by a method performed by a video processing apparatus, wherein the method comprises:
generating the bitstream of the video,
wherein the bitstream comprises multiple layers in multiple access units (AUs) comprising one or more pictures according to a first format rule, and
wherein the first format rule specifies that when an end of sequence (EOS) network abstraction layer (NAL) unit for a first layer is present in a first AU in the bitstream, for a second layer that is present in a coded video sequence (CVS) that includes the first layer and uses the first layer as a reference layer, a first picture in the second layer in a decoding order in an AU following the first AU in the bitstream is a coded layer video sequence start (CLVSS) picture, and
wherein the bitstream conforms to a third format rule, the third format rule specifies that the bitstream comprises at least a first picture that is output, wherein the first picture is in an output layer and has a third syntax element equal to one,
wherein the third syntax element is in a picture header, and
wherein the third syntax element affects a decoded picture output and a removal process associated with a hypothetical reference decoder (HRD).

* * * * *